United States Patent [19]
Terada et al.

[11] Patent Number: 6,101,310
[45] Date of Patent: *Aug. 8, 2000

[54] APPARATUS FOR READING AND WRITING INFORMATION FROM AND TO A TIME CODE TRACK IN A RECORDING MEDIUM

[75] Inventors: Masanori Terada; Masuko Nohara, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/706,605

[22] Filed: Sep. 5, 1996

[30] Foreign Application Priority Data

Sep. 7, 1995 [JP] Japan ..................................... 7-230262

[51] Int. Cl.[7] .......................... H04N 5/783; H04N 5/782
[52] U.S. Cl. ................................................ 386/68; 386/46
[58] Field of Search .................................. 386/46, 52, 83, 386/68, 55, 65, 95, 1, 4, 69, 81, 82, 79; H04N 5/782, 5/783

[56] References Cited

U.S. PATENT DOCUMENTS 5,282,049  1/1994  Hatakenaka et al. ................... 686/111
5,568,275  10/1996  Norton et al. ............................. 386/52

FOREIGN PATENT DOCUMENTS 92-324152  11/1992  Japan .
93-182427  7/1993  Japan .
95-134887  5/1995  Japan .
95-141719  6/1995  Japan .

Primary Examiner—Robert Chevalier
Attorney, Agent, or Firm—Frommer Lawrence & Haug, LLP.; William S. Frommer; Dennis M. Smid

[57] ABSTRACT

An apparatus usable by a broadcasting station for reading and writing information from and to a time code track of a recording medium such as a magnetic tape. Such information may include identification (ID) information representative of a respective broadcasting station and control information utilized for controlling the transmission of data recorded on the tape. The reading of the ID and control information may be performed while the tape travels at a speed greater than a normal playback speed. As a result, ID and control information recorded on a tape may be detected in a relatively short time. The recorded ID and control information may be easily rewritten so as to provide information pertaining to another broadcasting station.

10 Claims, 5 Drawing Sheets

APPARATUS FOR READING AND WRITING INFORMATION FROM AND TO A TIME CODE TRACK IN A RECORDING MEDIUM

BACKGROUND OF THE INVENTION

The present invention relates to an apparatus for reading and writing information from/to a recording medium and, more particularly, to such apparatus for use with broadcasting stations for reading and writing information pertaining to a respective broadcasting station from/to a recording medium.

Broadcasting stations (or the like) broadcast signals, such as video and audio signals, which may be recorded on recording mediums, such as magnetic tapes having a width of ½ inch, ¾ inch and so forth. These magnetic tapes are typically supplied from one broadcasting station to another. For example, magnetic tapes may be supplied between the broadcasting stations of the same broadcasting network, such as between a so-called key station and any of the local affiliated stations in the respective broadcasting network.

Each broadcasting station may assign identification (ID) information representative of the respective station to a tape. More specifically, such ID information may be coded and recorded in a time code track of the tape so as to enable the respective broadcasting station to be identified, as hereinafter more fully described. Such ID information may be formed of one or more symbols and/or numbers.

Further, each of the stations may also add control information to the tape which may be utilized for controlling the transmission of the contents of the tape by the respective station. Such control information may be recorded in the time code track of the tape in a manner similar to that of the ID information.

With regard to the time code, a time code may be produced by recording a tape address of a tape in a time unit form. Such time code may conform to a standard, such as a SMPTE (Society of Motion Picture and Television Engineers) standard (C98.12: time and control code for video and audio tape for a 525/30 television system), which may have 80 bits per frame. In the SMPTE time code, 32 bits per frame may be designated for use by a user. Both the ID information and the control information may be recorded within such user's bits.

As is to be appreciated, the identification (ID) information is preferably different for each respective station. Furthermore, the key station and affiliated station(s) may not always broadcast the same programs or may not broadcast a program in the same manner. For example, an affiliated station may decide to insert a different number of commercials and at different times than the key station. As such, the ID and control information and/or the recording positions thereof may be different for each broadcasting station.

When a tape is delivered from the key station to an affiliated station, the affiliated station may not be able to broadcast the program(s) recorded on this tape without changing the information added thereto by the key station. For example, if the affiliated station broadcasts the contents of the tape without changing the control information previously added by the key station, then a broadcasting error may occur wherein the tape is stopped at an incorrect position based on the control information added by the key station.

Therefore, the affiliated station should not use a tape received from the key station having ID and control information associated with the key station without assigning new ID and control information to such tape. In particular, the affiliated station should determine the recording positions for new ID and control information, erase the ID and control information recorded in the time code by the key station, and write new ID information and new control information in the time code track which pertains to the affiliated station.

To rewrite or overwrite such ID and control information, the affiliated station reproduces the recorded tape received from the key station at a normal playback speed by using a dedicated video tape recorder/reproducer (VTR) controller. During such reproduction, the affiliated station reads and decodes the coded ID information and control information recorded in the time code track, and superposes the decoded ID information and control information onto a picture and displays the same on a monitor to confirm the ID information and the control information. The affiliated station may then erase the ID and control information associated with the key station, and record ID and control information which pertains to the respective affiliated station.

Prior to returning the tape to the key station, the affiliated station erases the recorded ID and control information pertaining to the affiliated station, and records the original ID and control information associated with the key station.

The above-described operation is only performed while the tape is reproduced at normal playback speed. As a result, when a tape having a recording time of 60 minutes is supplied to an affiliated station from a key station, it takes 60 minutes to rewrite the ID and control information associated with the key station for the affiliated station and another 60 minutes to rewrite the ID and control information of the affiliated station for the key station for a total of approximately 120 minutes. As is to be appreciated, this procedure is inefficient.

If, however, the tape is reproduced at a speed higher than the normal playback speed, the above-described dedicated VTR controller may not properly reproduce or process the pictures and/or information obtained from the tape. During such improper video processing by the dedicated VTR controller, the ID and control information may not be properly displayed on the monitor which may prevent confirmation of the ID and control information.

Accordingly, it is desirable to detect ID and control information at a relatively high speed. Moreover, it may be desirable to perform the high-speed searching operation of the portion of the tape having the ID and control information recorded therein with reference to a STOP code (control information) located at the head of the portion which may be utilized for broadcasting the contents of the tape.

Further, although the above-described dedicated VTR controller may be utilized for confirming the ID and control information displayed on the monitor as previously described, such VTR controller may not be utilized for providing a copy or printout of the ID and control information superimposed on a picture. As is to be appreciated, a broadcasting station may desire to obtain a printout of such ID and control information.

Furthermore, a broadcasting station may not have an apparatus for erasing and recording ID information and/or control information. That is, editing of a tape is normally performed by an editing section which sends the edited tape to a broadcasting station. Accordingly, it may be desirable to provide an apparatus for erasing and recording ID information and/or control information which is relatively inexpensive and/or which is relatively easily adaptable to existing equipment at the broadcasting station.

Additionally, signals corresponding to a plurality of broadcasting stations may be recorded on one tape. In such situation, a user may perform operations involving the ID information (e.g., erasing ID information, recording ID information and so forth) based only on the user's memory. As such, it may be difficult for the user to correctly remember various ID information for different operation logs. Accordingly, it may be desirable to provide system wherein a user can reliably determine and retain the recorded ID and control information.

Further, if an operation log having reference to ID information can be discriminated, then a group of ID and control information referenced to operation logs may be collectively processed. For example, consider the situation in which ID and control information for the key station is not erased and ID and control information for an affiliated station is independently recorded on a tape. In this situation, the information for the key station and the information for the affiliated station may be processed independently upon detection.

OBJECTS AND SUMMARY OF THE INVENTION

An object of the present invention is to provide an apparatus for use by a broadcasting station which enables ID and control information recorded on a tape by another broadcasting station to be efficiently and easily detected.

Another object of the present invention is to provide an apparatus as aforesaid wherein the ID and control information may be read from the tape at a relatively high speed which is faster than a normal playback speed.

A further object of the present invention is to provide an apparatus as aforesaid which efficiently enables the ID and control information recorded on a tape by a broadcasting station to be erased and new ID and control information to be recorded thereon.

A still further object of the present invention is to provide an apparatus as aforesaid which enables a printout or a copy of the ID and control information to be provided to the respective broadcasting station.

A yet further object of the present invention is to provide an apparatus as aforesaid which has relatively low cost and/or which may be easily adaptable to existing equipment at a broadcasting station.

In accordance with an aspect of the present invention, an apparatus for reading and/or writing information is provided. The apparatus comprises a video tape recording/reproducing device (VTR); a monitor; and an identification (ID) information reading and writing unit coupled to the VTR and the monitor and including a personal computer system unit and an extended board unit. The personal computer system unit has a central processing unit (CPU), a keyboard, a printer, a storage device and a display. The extended board unit has an operation control device coupled to the CPU for controlling an operation of the VTR, an information reading device coupled to the VTR for reading information recorded in a time code track of tape at a relatively high speed and for supplying the read information to the CPU, and a character generating and superimposing device for receiving information recorded on the time code track from the CPU and for supplying information corresponding thereto to the monitor.

Other objects, features and advantages according to the present invention will become apparent from the following detailed description of illustrated embodiments when read in conjunction with the accompanying drawings in which corresponding components are identified by the same reference numerals.

DESCRIPTION OF THE PREFERRED EMBODIMENTS

A reading and writing apparatus according to an embodiment of the present invention will not be described with reference to, the accompanying drawings.

As previously described, ID information may be formed of a symbol and/or a number and may be used to identify a specific source. A broadcasting station typically assigns unique ID information to the recorded tape which is different from that of other broadcasting stations. Control information, which may include a STOP code, an END code or the like, may be used for controlling the transmission of the contents of the tape by a broadcasting station.

Figure 1:
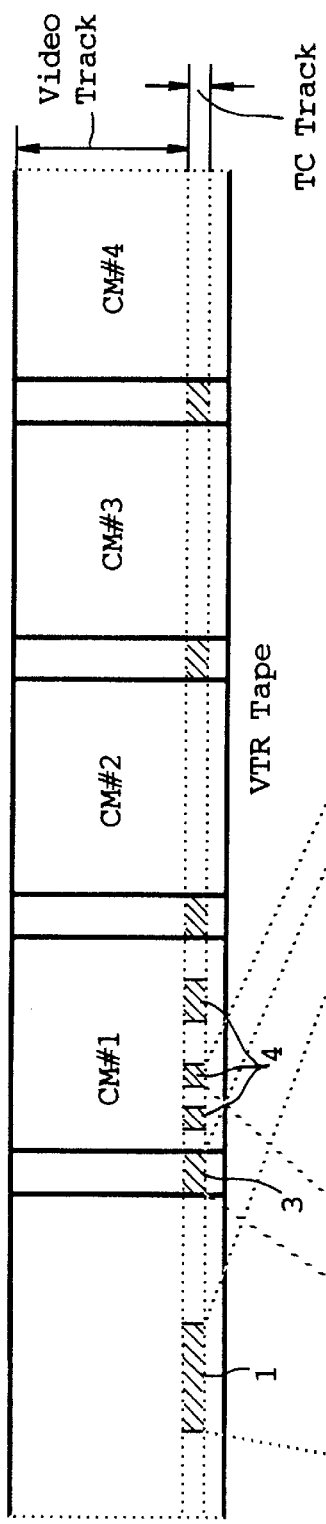
FIGS. 1A and 1B are diagrams to which reference will be made in explaining a format for ID and control information recorded in a time code track of a VTR tape.

An example of a recording pattern of a VTR tape is illustrated in FIG. 1A. Such tape may have video track wherein a video signal may be recorded, an audio track (not shown) formed below the video track in the tape width direction wherein an audio signal may be recorded, and a time code (TC) track also formed below the video track in the tape width direction. A time code, which provides an indication of tape position, may be recorded in the time code track. Such time code may conform to a SMPTE standard and, as such, may have a predetermined code format of 80 bits per frame of which 32 bits may be available to a user (hereinafter referred to as "user bits"). The ID information and the control information utilized by the present invention may be recorded in such user bits.

FIG. 1B illustrates a code data format of ID and control information recorded in a time code track over a plurality of frames. An example of such tape format used when a commercial (CM) is broadcasted will now be described. In this description, it is assumed that CM#1, CM#2, CM#3, CM#4 . . . are recorded on one tape wherein each of these is referred to as a segment, and that a CM#n which is one segment (spot) is formed of a plurality of commercials of products wherein each of the commercials is referred to as a resource.

More specifically, as shown in FIG. 1A, in the user bits of the time code track, a "tape data code" 1 for specifying the contents of the tape is recorded at the head of the tape, a "segment code" 3 for specifying the contents of a segment (spot) is recorded before each of the segments (spots), and a "resource code" 4 for specifying the contents of a resource (source) is recorded in each of the resources (sources). Each of the tape data code 1, the segment code 3 and the resource code 4 has substantially the same format. For example, is shown in FIG. 1B, each of the tape data code 1, the segment code 3 and the resource code 4 may have a header (4 bytes), an attribute (2 bytes), an ID (8 bytes), an attribute (2 bytes), a title (16 bytes), an attribute (2 bytes), a start of memory SOM (4 bytes), an attribute (2 bytes) and a duration DUR (4 bytes).

With regard to the tape data code 1 coded data is recorded in the tape header which indicates whether ID information or control information is recorded therein. The attribute (Att.) is located before each data section and indicates the form or code in which the data located immediately after the respective attribute is expressed, or example, a binary code, a hexadecimal code or the like. Coded information representing a broadcasting date and day (for example, "WED, August 10") or the like may be recorded in the tape ID. Coded information representing a title or description of the contents of a picture (for example, "a commercial of a household electric appliance") or the like may be recorded in the tape title. Data recorded in the start of memory SOM may indicate a start time in units of time (for example, in minutes and seconds). Data recorded in the duration DUR may indicate the duration time of a program in units of time (for example, in minutes and seconds). The sum of the times indicated by the SOM and DUR data indicates the ending time.

Similarly, with regard to the segment code 3, coded data is recorded in the tape header which indicates whether ID information or control information is recorded therein. Coded data representing a broadcasting start time (for example, "18:19") may be recorded in the ID section. Coded data representative of a title or the contents of a picture (for example, "a commercial of a company A") or the like may be recorded in the title section. Data recorded in the start of memory SOM may indicate a start time in units of time (for example, minutes and seconds). Data recorded in the duration DUR may indicate the duration time of a program in units of time (for example, in minutes and seconds).

Similarly, data representative of an ID, a title, a SOM, and a DUR are recorded for the resource code 4.

Segment or spot data pertaining to the segments (spots) may be recorded immediately after the tape data code 1 located at the head of the tape in the above-described tape format. Control information such as a "STOP code" which may be used as head searching information at the head of the tape, and an "END code" which may be used as end information at the end of the segments (spots), and so forth may be recorded in accordance with the above tape format.

It should be noted that ID and control information corresponding to pictures may be recorded on the tape and that, according to an embodiment of the present invention as hereinafter more fully described, such ID and control information which may include information of an ID type (type of data such as the tape data, the segment code or the like), an ID text (contents of the ID), a title text (contents of the title), the SOM and the DUR may be read at high speed, displayed, stored in a memory, changed if necessary, and rewritten on the tape.

Figure 2:
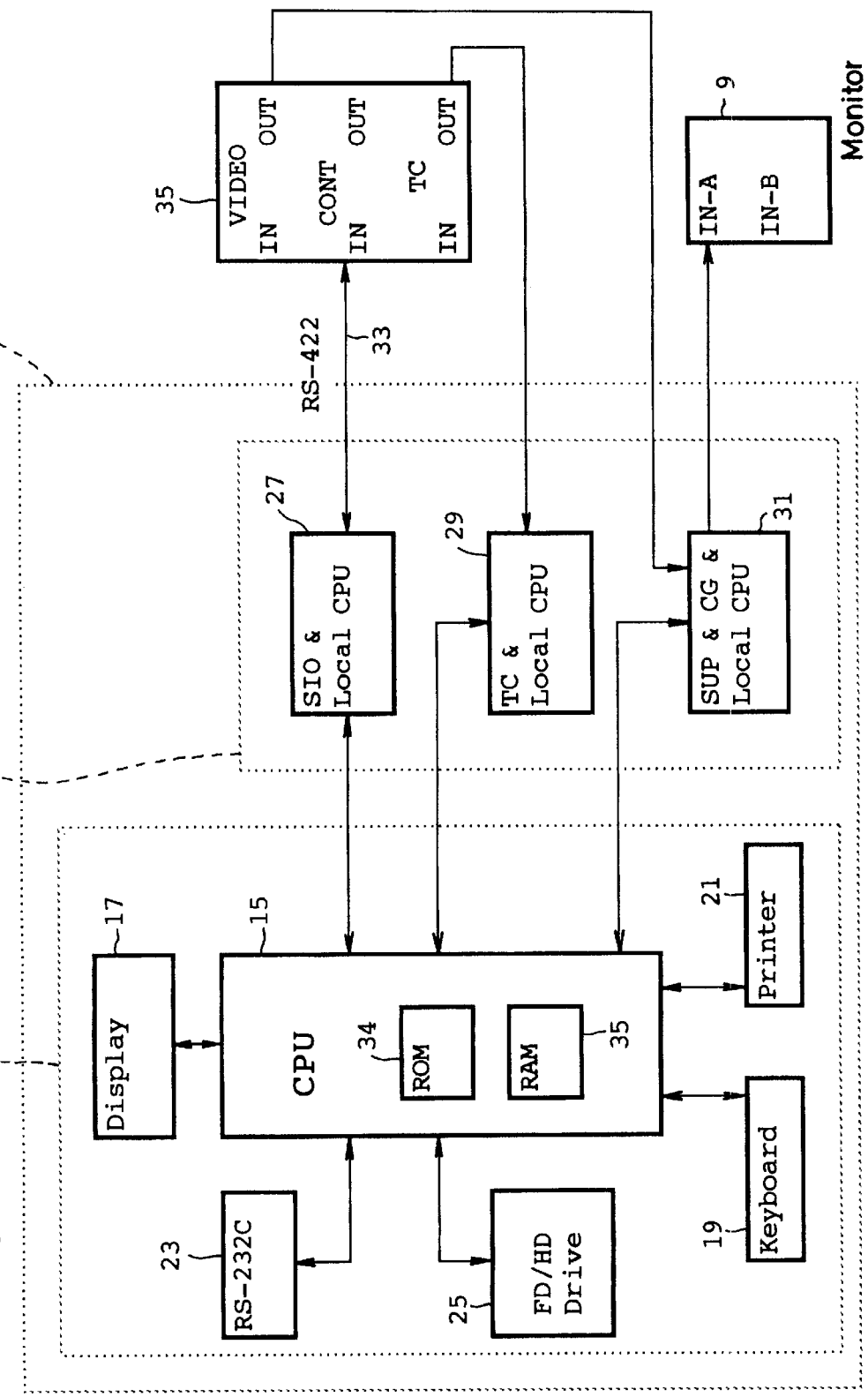
FIG. 2 is a diagram of a reading and writing apparatus according to an embodiment of the present invention.

FIG. 2 illustrates a reading and writing apparatus. As shown therein, such apparatus generally includes a VTR 5, a reading and writing unit 7, and a monitor 9. The reading and writing unit 7 may include a portion 11 of a personal computer system (hereinafter, referred to as a "personal computer system unit 11") and an extended board unit 13. The personal computer system unit 11 may include a CPU 15, a display apparatus 17, a keyboard 19, a printer 21, an RS-232C interface 23 and a floppy-disk (FD)/hard-disk (HD) drive 25. Such personal computer system 11 may be a 9800 series personal computer system manufactured by the Nippon Electric Co. Ltd or the like. The extended board unit 13 may include a serial I/O board (SIO) and local CPU 27, a time code (TC) reader and local CPU 29, and a superimposing unit (SUP), character generator (CG) and local CPU 31.

Each of the units in the reading and writing apparatus of FIG. 2 will now be further described.

The VTR 5 may reproduce a recorded tape such as a tape supplied from a key station and may record information onto such tape. The VTR 5 may include a plurality of input/output terminals such as video input/output terminals, control input/output terminals, and time code (TC) information input/output terminals. The VTR 5 is coupled to the SIO and local CPU 27 of the extended board unit 13 by way of the control terminals and an interface 33 which may be a RS422 interface having a nine-pin connector. The VTR 5 is further coupled to the TC and local CPU 29 by way of the TC terminals, and to the SUP, CG and local CPU 31 by way of the video terminals.

The monitor 9 may be a typical display device having input terminals A and B. The monitor 9 is coupled by way of the input terminal A to the SUP, CG and local CPU 31 of the extended board unit 13 and is adapted to receive an output signal therefrom and to display the same.

The SIO and local CPU 27 is connected to the control input terminal of the VTR 5 by way of the RS-422 interface 33, and is further connected to the CPU 15 of the personal computer system unit 11 by way of an interface. The SIO and local CPU 27 may receive control information from the CPU 15 and, in accordance therewith, transmit control signals to the VTR 5 and may receive control feedback information from the VTR 5 and transmit the same to the CPU 5 so as to control an operation (such as a tape travel operation) of the VTR. That is, the SIO and local CPU 27 may receive control signals from the CPU 15 and, in response thereto, may serially communicate with the VTR 5 so as to control operations of the VTR 5 such as reproduction, recording, tape travel, tape-stop operations or the like in accordance with instruction signals from the CPU 15. For example, the SIO and local CPU 27 may control a recording operation wherein an affiliated station records ID information and control information in a time code track of a tape. As another example, the SIO and local CPU 27 may control a tape-travel operation and a tape-stop operation wherein the tape may be respectively positioned and stopped at a predetermined tape address such as that indicated by a STOP code or the like.

Further, the SIO and local CPU 27 may read information recorded in a time code track of a tape during a reproduction operation. However, during such reproduction operation, which is controlled by the SIO and local CPU 27 and which is different from that controlled by the TC and local CPU 29 as hereinafter described, information may be properly read only when the tape is reproduced at the normal playback speed.

Furthermore, as hereinbelow described with reference to FIG. 3, the SIO and local CPU 27 may control two or more VTRs simultaneously.

The local CPU of the SIO and local CPU 27 is provided to reduce the burden on the CPU 15 of the personal computer system unit 11 and to disperse processing performed by the CPU 15. For example, the local CPU may perform a processing operation to check communication with the VTR as hereinafter more fully described.

The TC and local CPU 29 is connected to the TC output terminal of the VTR 5, and is further connected to the CPU 15 of the personal computer system unit 11 through an interface. The TC and local CPU 29 may include a time code (TC) reader and a local CPU for controlling the time code reader and is adapted to enable high-speed communication between the VTR and the TC and local CPU 29. As a result, the TC and local CPU 29 may read recorded information, such as ID and control information, at a relatively high speed from a time code track of a tape being reproduced by the VTR 5. That is, unlike the SIO and local CPU 27, the TC reader may read ID and control information recorded in a time code track of a tape at a desired speed ranging from a relatively low speed to a relatively high speed. For example, the TC reader may read such information at a speed which is one hundred times the normal playback speed. Additionally, the TC reader may read the ID and control information even when the tape is being fast forwarded (FF) or rewound (REW).

The local CPU of the TC and local CPU 29 may decode the read ID and control information and supply the decoded information to the CPU 15. Further, the local CPU of the TC and local CPU 29 may provide parallel processing with the CPU 15 and may control the high-speed reading and decoding operations. As a result, the TC and local CPU 29 may be operated independently of a superimposing operation (wherein characters may be superimposed on a picture) performed by the SUP, CG and local CPU 31 as described hereinafter. As such, in spite of the comparatively slow superimposing operation of the SUP, CG and local CPU 31, the TC and local CPU 29 may perform a high-speed reading operation simultaneously with the superimposing operation.

The SUP, CG and local CPU 31 is connected to the video output terminal of the VTR 5, the input terminal A of the monitor 9, and the CPU 15 by way of an interface. The SUP, CG and local CPU 31 may receive the ID and control information decoded by the TC and local CPU 29 from the CPU 15 and may receive a video signal representative of a picture or pictures from the VTR 5. The character generator (CG) of the SUP, CG and local CPU 31 may generate characters in accordance with the received ID and control information and the superimposing unit (SUP) thereof may superimpose the generated characters onto the picture received from the VTR 5. The local CPU of the SUP, CG and local CPU 31 is provided to disperse the processing of the CPU 15 and to control a number of operations performed by the SUP and CG 29 such as a character generating operation, a superimposing operation and so forth.

The CPU 15 is connected to the SIO and local CPU 27 through an interface and may transmit and receive control information therethrough which is utilized for controlling an operation of the VTR 5 in a manner as previously described. The CPU 15 is further connected to the TC and local CPU 29 through an interface and may receive therethrough the decoded ID and control information from the TC and local CPU 29. The CPU 15 may process the received ID and control information in a predetermined manner, display the processed ID and control information on the display 17, and store such processed information in a floppy disk (FD) and/or a hard disk (HD) by use of the FD/HD drive 25 in accordance with instructions from a user. The CPU 15 is still further connected to the SUP, CG and local CPU 31 through an interface and may supply signals (such as decoded ID and control signals) to the SUP, CG and local CPU 31 and may receive feedback signals therefrom so as to control operations pertaining to the generating of characters, the superimposing of the generated characters on a picture and the outputting of the picture with the superimposed characters to the monitor 9.

The display apparatus 17 is connected to the CPU 15. The display apparatus may receive ID and control information in a predetermined format corresponding to a time code from the CPU 15 and may display the same. As a result, a user may view the ID and control information and the tape addresses on a display screen of the display 17. Further, when the user is rewriting the ID and control information by use of the keyboard 19, the user may view such changes on the display screen.

The keyboard 19, which may be a typical computer keyboard, may be utilized by a user for providing instructions to the CPU 15 for the operation of the reading and writing apparatus. For example, if it is desired to rewrite the ID and control information, a user may provide the new ID and control information by use of the keyboard 19.

The FD/HD drive 25 may include a HD drive having a relatively large storage capacity (such as approximately several hundred Mbytes) and a FD drive which may be used with two types of floppy disks, such as a 2 HD type of 3.5-inch floppy disk (which may have a recording capacity of approximately 1 Mbyte) and a 2DD type of 3.5-inch floppy disk (which may have a recording capacity of approximately 640 Kbytes). The FD/HD drive 25 may be utilize to record an application program and data for managing the reading and writing apparatus, store ID and control information obtained from a time code track of a tape reproduced by the VTR 5 by the TC and local CPU 29 or the SIO and local CPU 27, and store newly generated ID and control information.

The CPU 15 may include a read-only memory (ROM) 34 and a random-access memory (RAM) 35. Programs and data for managing an initializing operation and various other operations of the CPU 15 may be stored in the ROM 34. The RAM 35 may be used as a very high-speed work memory for storing a program and flag information temporarily.

The printer 21 is connected to the CPU 15 and is adapted to print information received from the CPU 15. For example, the printer 21 may print the read ID and control information and the newly generated ID and control information.

Figure 3:
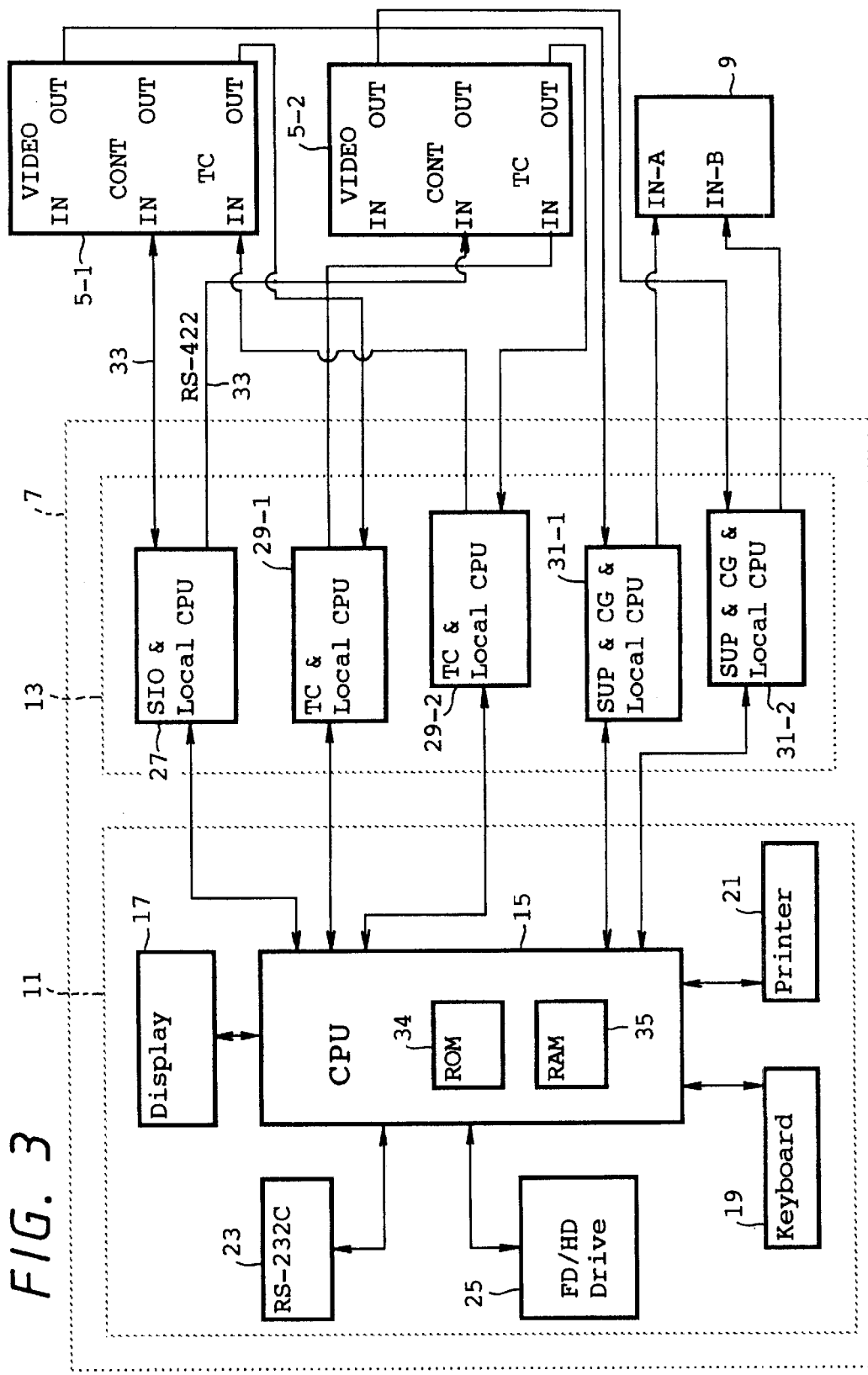
FIG. 3 is a diagram of a modified reading and writing apparatus according to an embodiment of the present invention.

FIG. 3 illustrates another reading and writing apparatus according to an embodiment of the present invention. With the exception of two VTRs (a main VTR 5-1 and a sub VTR 5-2), two TC and local CPU's 29-1 and 29-2, and two SUP, CG and local CPU's 31-1 and 31-2, the apparatus of FIG. 3 is substantially similar to that of FIG. 2. Such duplication of elements is employed to avoid an interruption during broadcasting which may otherwise occur due to a problem or accident. That is, the duplicate elements (i.e., the two VTRS, the two TC and local CPUs, and the two SUP, CG and local CPUs) may be simultaneously operated so as to increase redundancy, thereby improving the reliability of the reading and writing apparatus.

The elements of the reading and writing apparatus of FIG. 3 are arranged as shown therein. Further, except for the above-described differences, the apparatus of FIG. 3 operates in substantially the same manner as the apparatus of FIG. 2 and, as such, the description of the FIG. 2 apparatus may be applied to the FIG. 3 apparatus. Accordingly, and in the interest of brevity, a further description of the apparatus of FIG. 3 is omitted.

Figure 4:
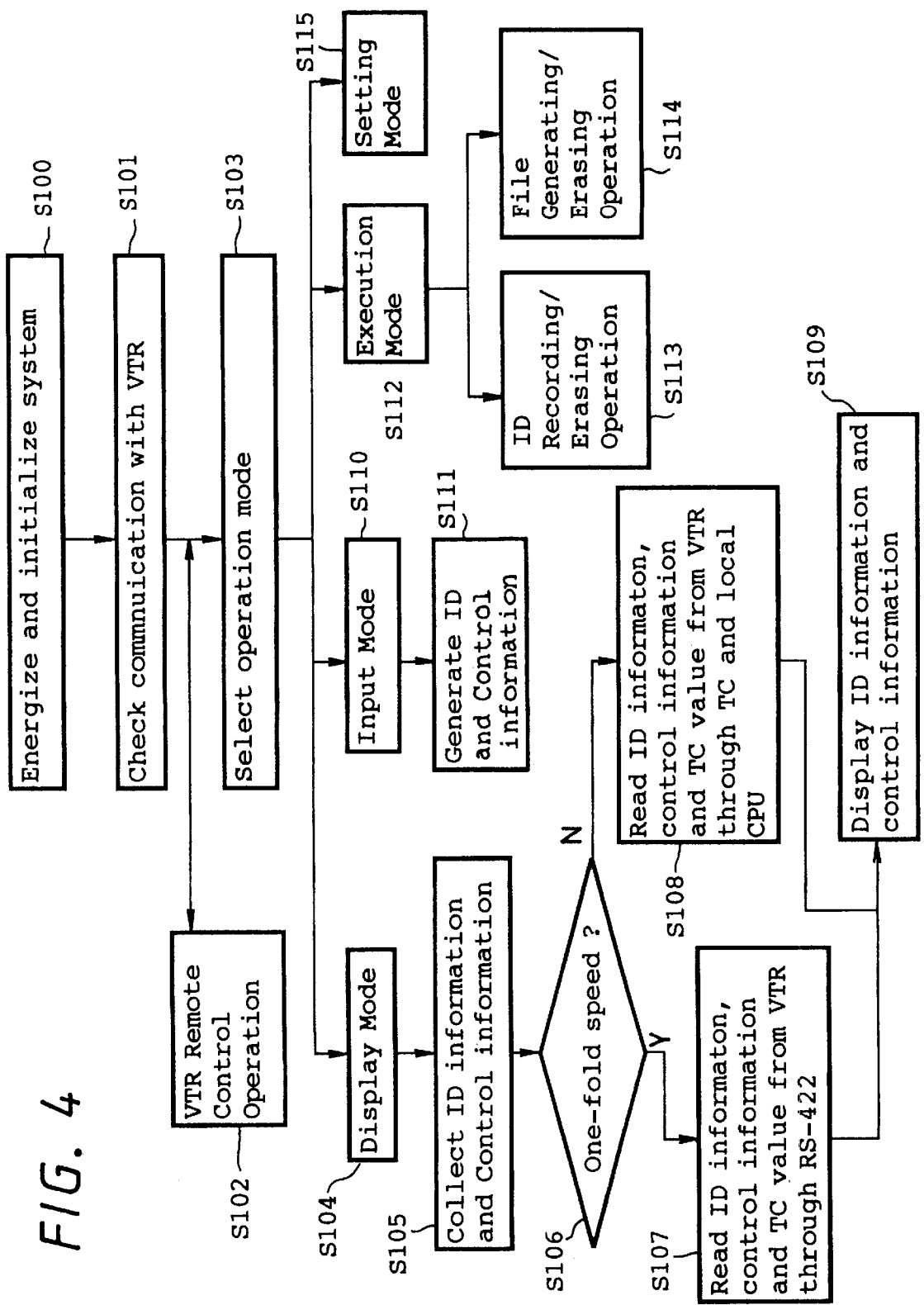
FIG. 4 is a flowchart to which reference will be made in explaining an operation of the reading and writing apparatus of FIG. 2.

A description of the operation of the present reading and writing apparatus of FIG. 2 will now be provided with reference to the flowchart of FIG. 4.

After energizing the present reading and writing apparatus, an initializing operation is performed as indicated in step S100. Thereafter, processing proceeds to step S101 wherein the SIO and local CPU 27, in accordance with an instruction from the CPU 15, checks a state of communication with the VTR 5 through the RS-422 interface 33. If the communication state is acceptable, processing may proceed.

Upon activating a VTR remote control operation, such as by depressing a function key F7 (FIG. 5) of the keyboard 19, processing proceeds to step S102. The VTR remote control mode is utilized for controlling an operation of the VTR 5. When a user inputs an instruction through the keyboard 19, the SIO and local CPU 27 in accordance with the received instruction may communicate with the VTR 5 by way of the RS-422 interface 33 so as to control an operation or operations of the VTR 5 (such as reproducing, recording, stopping, rewinding the tape and so forth). The VTR remote control operation may be simultaneously performed in a selected operation mode described below.

Upon requesting operation mode selection, such as by depressing a function key F10 (FIG. 5) of the keyboard 19, processing proceeds to step S103. As a result, a user may select a display mode in step S104, an input mode in step S110, an execution mode in step S112, or a setting mode in step S115 by, for example, using the keyboard 19.

If the display mode in step S104 is selected such as by depressing a F3 function key (FIG. 5), processing proceeds to step S105 wherein ID and control information are collected. Tape travel speed for the VTR 5 is initially set. In setting the tape travel speed, processing may proceed to the above VTR remote control mode of step S102, wherein the tape travel speed may be set to one of a plurality of speeds such as a normal playback speed (1x), a speed one-hundred times (100x) the normal playback speed or fast-forward speed, a rewinding speed and so forth. Thereafter, the processing proceeds to step S106 whereupon a determination is made as to whether or not the set tape travel speed is the normal playback speed.

If the determination in step S106 is affirmative, processing proceeds to step S107 wherein the SIO and local CPU 27 reads the ID and control information together with the time code (TC) value from the VTR 5 through the RS-422 interface 33 and supplies the same to the CPU 15. Since the selected operation mode is the display mode (see step S104), the ID and control information supplied to the CPU 15 is displayed on the display 17 in a format corresponding to the TC value (i.e., recording position) as indicated in step S109. An example of such display is illustrated in FIG. 5.

On the other hand, if the determination in step S106 is negative, such that the tape travel speed is not set to the normal playback speed but to another speed such as a speed higher than the normal playback speed, processing proceeds to step S108 wherein the TC and local CPU 29 reads the ID and control information together with the time code (TC) value from the time code track and supplies the same to the CPU 15. Similarly, since the selected mode is the display mode, the ID and control information are displayed on the display 17 in a format corresponding to the TC value (i.e., recording position) as indicated in step S109. As is to be appreciated, by utilizing the TC and local CPU 29, the ID and control information may be read at a relatively high speed so that the time to detect the ID and control information may be relatively short. For example, if the tape travel speed is set to the 100x speed, the ID and control information recorded in a tape having a recording time of one hour may be detected in approximately 36 seconds. As is to be appreciated, if the tape travel speed for such tape is set to the normal playback speed, it would take 1 hour to detect the recorded ID and control information.

Figure 5:
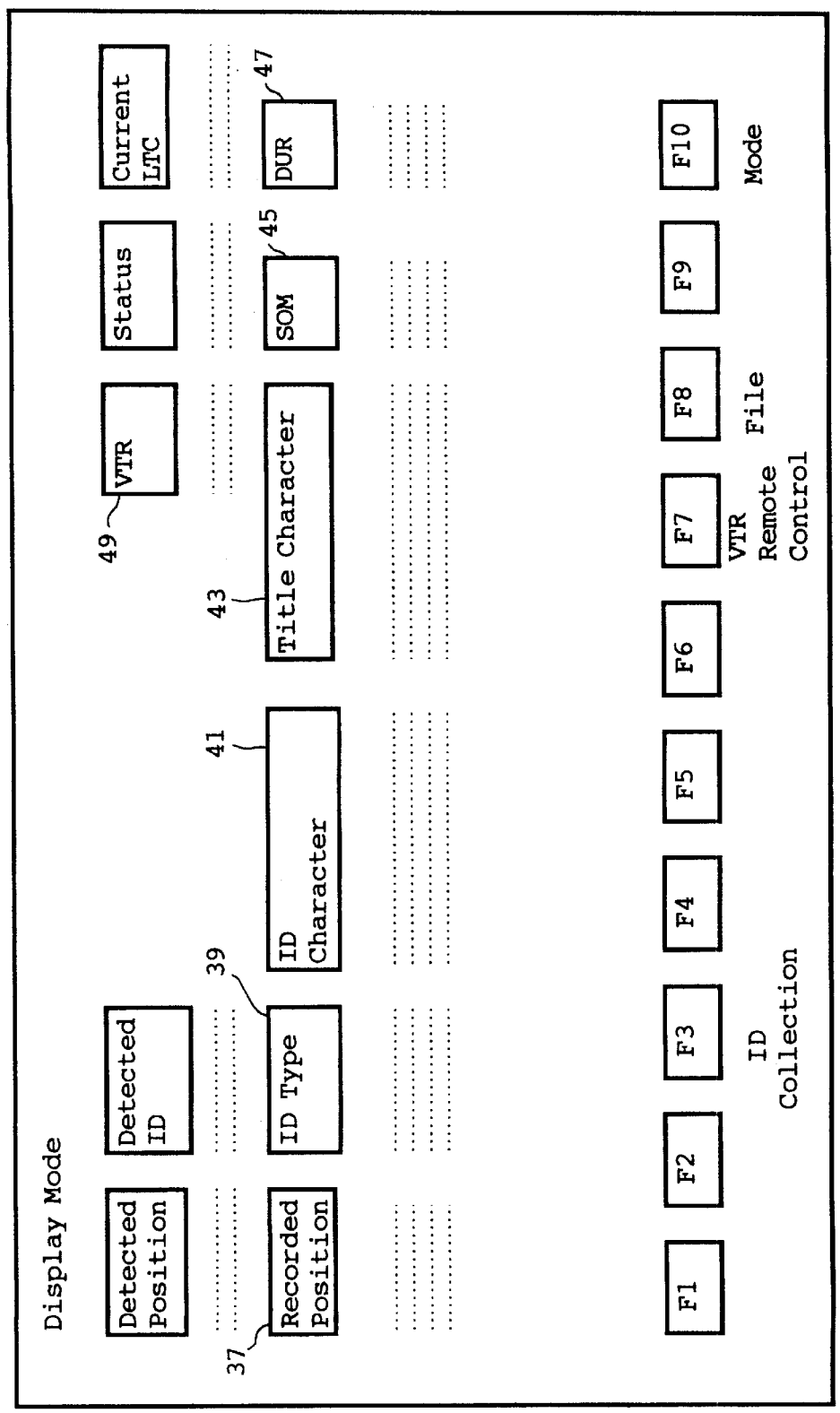
FIG. 5 is a diagram to which reference will be made in explaining a display of the ID and control information by the reading and writing apparatus of FIG. 2.

As previously mentioned, FIG. 5 illustrated an example of screen which may be displayed on the display 17 when the reading and writing apparatus is operating in the display mode. At a recording position display portion 37, a tape address of the data displayed at the right side thereof may be displayed in the form of the time code such as "00:01:34:00". At an ID type display portion 39, the ID type such as a tape data code, a segment code, resource code or the like may be displayed. At an ID character display portion 41, broadcasting date and day of the week may be displayed as, for example, "0215 WED", when the ID type is the tape data code. However, when the ID type is a segment code, the broadcasting start time may be displayed as, for example, "1600". At a title character display portion 43, contents of a picture of the tape may be displayed as, for example, "a commercial of a household electric product", when the ID type is the tape data code. However, when the ID type is the segment code, specific contents thereof may be displayed as, for example, "a commercial of a company A". At each of a SOM display portion 45 and a DUR display portion 47, the appropriate time may be displayed as, for example, "00:02:03:00". An indication of the respective VTR or VTRs may be displayed in a VTR display portion 49.

Predetermined functions may be respectively assigned to a number of function keys which may be displayed. For example, function key F3 may be assigned to the collection of the ID and control information as in step S105, the function key F7 may be assigned to the VTR remote control mode as in step S102, a function key F8 may be assigned to a mode for generating a file, and a function key F10 may be assigned to the selection of the operation mode as in step S103.

The screen of FIG. 5 may display other information in addition to that described above. For example, information pertaining to the detected position, the detected ID, the status of an operation, and so forth may be displayed in respective portions of the screen.

Returning to FIG. 4, if the input mode is selected as in step S110, the ID and control information may be newly generated, rewritten, and temporarily stored in the RAM. At such time, a picture may be displayed on the display 17 in a predetermined display format such as that shown in FIG. 5. While watching the display 17, a user may input the tape address at the recording position display portion 37 in the form of a time code and may input data in any or all of the ID type display portion 39, the ID character display portion 41, the title character display portion 43, the SOM display portion 45 and the DUR display portion 47 in accordance with the input time code as indicated in step S111. Such input or set data may be temporarily stored in the RAM 35 and displayed on the display 17.

If the execution mode is selected in step S112, processing may be performed in preparation of a recording/erasing operation in step S113 and a file generating/erasing operation in step S114. In step S113, the ID and control information received by the SIO and local CPU 27 or the TC and local CPU 29 from the VTR 5 in the display mode of step S104 may be temporarily stored in the RAM 35 and displayed in the display 17 in a predetermined format such as that shown in FIG. 5. While watching the display 17, the user may record or erase ID and control information through the use of the keyboard 19. Upon completion of such recording/erasing operation, the ID and control information processed in this step are outputted from the CPU 15 to the VTR 5 by way of the SIO and local CPU 27. The VTR may record such received information in a predetermined time code track. In step S114, a file pertaining to the ID and control information may be generated or erased. If desired, the generated file may be stored in a disk by use of the FD/HD drive 25.

The information read out while the tape travels at any of the available speeds may be temporarily stored in the RAM 35 of the CPU 15. Such stored data may be utilized in further processing operations performed by the reading and writing apparatus. For example, in the execution mode of step S112, a file containing the temporarily stored information may be generated in a disk by the use of the FD/HD drive 25.

If the setting mode is selected in step S115, the user may change predetermined parameters or settings relating to the operation of the reading and writing apparatus. For example, the user may change the tape data code format (shown in FIG. 1) and may change a pre-roll time (i.e., a time from the tape start to the start of a picture).

When a respective broadcasting station (e.g., an affiliated station) rewrites or newly records data on a tape, the data may be flagged so as to specify the broadcasting station. In this arrangement, when the flag is designated in the operations of reading or rewriting ID and control information, the respective broadcasting station which recorded the ID and control information may be specified. As a result, it is possible to independently process only the ID and control information having a predetermined flag.

Thus, the present invention provides a reading and writing apparatus which enables a broadcasting station to efficiently and easily detect, erase and rewrite ID and control information recorded by another broadcasting station. That is, ID and control information may be detected by the TC and local CPU 29 even when a tape travels at a high speed, such as when the VTR is operating in a fast forward (FF) mode or a rewinding (REW) mode. Such high speed detection significantly reduces the time which would otherwise be needed to perform this detection if the tape only traveled at the normal playback speed. Additionally, the detected ID and control information may be successively displayed on the display 17 on a real-time basis and may be easily rewritten by using the keyboard 19.

Further, since the detected ID and control information may be stored in the RAM 35 or on a disk, the ID and control information may be readily printed by the printer 21. Such printed information may be utilized by the broadcasting station as, for example, a program schedule. Moreover, the data stored in the disk may be further processed and utilized for a variety of functions or operations.

Furthermore, the superimposing operation (wherein ID and control information previously read and decoded is superimposed on a picture by the SUP, CG and local CPU 31) may be performed independently of and/or simultaneously with the reading of information and/or the time code from the time code track by the TC and local CPU 29.

Additionally, if ID and control information is flagged so as to indicate processing by a respective broadcasting station, ID and control information may be collectively processed in accordance with an operation log. By utilizing the flagged information, a group of the ID and the control information corresponding to a plurality of flags may be processed.

Further, since the TC and local CPU 29 can detect a STOP code on a tape wherein ID and control information have been rewritten even when the tape is traveling at a high speed, the tape may be positioned and stopped at the head-searching STOP code position even when the tape travels at a high speed.

Furthermore, the present reading and writing apparatus enables two or more VTRs to be operated independently or simultaneously.

The present invention may be fabricated at a relatively low cost. Additionally, if a broadcasting station already has some equipment utilized in the present invention such as a personal computer system, this equipment may be readily modified so as to incorporate the present invention.

Although the present reading and writing apparatus was described as having a certain number of various elements, such as one or two VTRs, one or two TC and local CPUs 29, one SIO and local CPU 27 and so forth, the present invention is not so limited. For example, the present apparatus may incorporate different numbers of such elements.

Further, although in describing the present reading and writing apparatus, a VTR was utilized and ID and control information was recorded on magnetic tape, the present invention is not so limited. That is, other types of recording media and recording/reproducing devices may be utilized and signals indicative of information other than ID and control information may be recorded on such recording media.

Furthermore, although the present invention was described as being usable by a broadcasting station, the present invention is not so limited and may be utilized in a number of other situations.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. An apparatus for reading and/or writing information, said apparatus comprising:

a CPU;

a video tape recording/reproducing device (VTR) operable to drive a tape at a normal speed and a high speed which is greater than said normal speed;

first reading means for reading at least one of identification (ID) information which represents a broadcasting station and control information from a time code track of said tape when said tape is driven by said VTR at said normal speed; and second reading means separate from said first reading means for reading at least one of the identification (ID) information and the control information from the time code track of said tape when said tape is driven by said VTR at said high speed.

2. An apparatus for reading and/or writing information according to claim 1, wherein said tape includes video signals intended for transmission and said control information is utilized for controlling said transmission of said video signals.

3. An apparatus for reading and/or writing information, said apparatus comprising:

a video tape recording/reproducing device (VTR) operable to drive a tape at a normal speed and a high speed which is greater than said normal speed;

a monitor; and an identification (ID) information reading and writing unit coupled to said VTR and said monitor and including a personal computer system unit and an extended board unit, said personal computer system unit having a central processing unit (CPU), a keyboard, a printer, a storage device and a display, and said extended board unit having first information means coupled to said VTR for reading at least one of identification (ID) information which represents a broadcasting station and control information recorded in a time code track of said tape when said tape is driven by said VTR at said normal speed second information means separate from said first information means and coupled to said VTR for detecting at least one of the identification (ID) information and the control information recorded in the time code track of said tape when said tape is driven by said VTR at said high speed and for reading at least one of the ID information and the control information and for supplying the read information to said CPU, and character generating and superimposing means for receiving information recorded on the time code track from said CPU and for supplying information corresponding thereto to said monitor.

4. An apparatus for reading and/or writing information according to claim 3, wherein said character generating and superimposing means includes a character generator for receiving the read information and for generating character information therefrom, superimposing means for receiving picture information from said VTR and for superimposing thereon the character information from said character generator, and a local CPU for controlling operations involving the generation of the character information and the superimposing of the same onto the picture information.

5. An apparatus for reading and/or writing information according to claim 3, wherein said CPU causes the read information received from said second information means to be stored in said storage device.

6. An apparatus for reading and/or writing information according to claim 3, wherein said CPU causes the read information received from said second information means to be displayed in said display in a format corresponding to a time code.

7. An apparatus for reading and/or writing information according to claim 3, wherein said CPU receives the read information from said second information means and stores the received information in said storage device and causes said information to be displayed in said display in a format corresponding to a time code, and further comprising means including said keyboard for rewriting the information in the time code track such that updated information is written in the time code track of said tape.

8. An apparatus for reading and/or writing information according to claim 3, wherein said time code track of the tape includes a flag which indicates an origin of the information recorded on the tape.

9. A reading/writing apparatus for use by a broadcast station wherein video and/or audio signals recorded on a recording medium are broadcasted, said apparatus comprising:

a recording/reproducing device for recording identification (ID) information and control information in a time code track of said recording medium and for reproducing recorded ID and control information from said time code track of said recording medium, said ID information representing a respective broadcast station and said control information being utilized for controlling the broadcasting of said video and/or audio signals, said recording/reproducing device being operable during a reproduction operation to transport said recording medium at one of a plurality of speeds including a normal speed and a speed faster than said normal speed;

first reading means coupled to said recording/reproducing device for reading at least one of the reproduced ID and control information when said recording/reproducing device transports said recording medium at said normal speed and for processing the same;

second reading means separate from said first reading means and coupled to said recording/reproducing device for reading at least one of the reproduced ID and control information when said recording/reproducing device transports said recording medium at the speed faster than said normal speed and for processing the same; and means for writing new ID and control information in said time code track.

10. A reading/writing apparatus according to claim 9, further comprising means for displaying said ID and control information.

* * * * *